US010663292B2

United States Patent
Raab et al.

(10) Patent No.: US 10,663,292 B2
(45) Date of Patent: *May 26, 2020

(54) QUALITY INSPECTION SYSTEM AND METHOD OF OPERATION

(71) Applicant: FARO Technologies, Inc., Lake Mary, FL (US)

(72) Inventors: Simon Raab, Santa Barbara, CA (US); Bernd-Dietmar Becker, Ludwigsburg (DE); Rolf Heidemann, Stuttgart (DE); Steffen Kappes, Oedheim-Degmarn (DE); João Santos, Kornwestheim (DE); Oliver Zweigle, Stuttgart (DE); Aleksej Frank, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/527,828

(22) Filed: Jul. 31, 2019

(65) Prior Publication Data

US 2020/0096328 A1 Mar. 26, 2020

Related U.S. Application Data

(63) Continuation of application No. 16/139,896, filed on Sep. 24, 2018, now Pat. No. 10,408,606.

(51) Int. Cl.
*G01B 11/14* (2006.01)
*G01B 11/25* (2006.01)
(Continued)

(52) U.S. Cl.
CPC .......... *G01B 11/2522* (2013.01); *G01S 17/06* (2013.01); *G06T 7/20* (2013.01); *G06T 7/75* (2017.01); *G06T 7/97* (2017.01)

(58) Field of Classification Search
CPC .... G01J 3/02; G01J 3/513; G01J 3/51; G01N 15/1459; G01N 21/65
(Continued)

(56) References Cited

U.S. PATENT DOCUMENTS 8,929,601 B2 1/2015 Caulfield
9,294,690 B1 3/2016 Caulfield
(Continued)

FOREIGN PATENT DOCUMENTS

GB 2551609 A 12/2017

OTHER PUBLICATIONS

European Search Report for Application No. 1919795.8 dated Jan. 20, 2020; 9 pgs.
(Continued)

*Primary Examiner* — Md M Rahman
(74) *Attorney, Agent, or Firm* — Cantor Colburn LLP

(57) ABSTRACT

An inspection system for measuring an object is provided. The inspection system includes an entryway sized to receive the object. At least two non-contact coordinate measurement devices are positioned with a field of view being at least partially within or adjacent to the entryway, each of the at least two non-contact coordinate measurement devices being operable to measure 3D coordinates for a plurality of points on the object as one of the object or the entryway move from a first position to a final position. A pose measurement device is operable to determine the six-degree of freedom (6DOF) pose of the object. One or more processors are provided that register the 3D coordinates for the plurality of points from each of the at least two non-contact coordinate measurement devices based at least in part on the 6DOF pose of the object.

19 Claims, 12 Drawing Sheets

(51) Int. Cl.
   *G06T 7/20* (2017.01)
   *G01S 17/06* (2006.01)
   *G06T 7/00* (2017.01)
   *G06T 7/73* (2017.01)

(58) Field of Classification Search
   USPC .......................................................... 356/625
   See application file for complete search history.

(56) References Cited

U.S. PATENT DOCUMENTS

| | | |
   |---|---|---|
   | 9,632,504 B1 | 4/2017 | Watts |
   | 9,804,577 B1 | 10/2017 | Troy et al. |
   | 9,866,773 B2 | 1/2018 | Caulfield |
   | 2008/0177427 A1 | 7/2008 | Marty et al. |
   | 2014/0249663 A1 | 9/2014 | Voillaume |
   | 2016/0142657 A1 | 5/2016 | Caulfield |
   | 2018/0160059 A1 | 6/2018 | Caulfield |

OTHER PUBLICATIONS

"Equator™ gauging explained" Renisi, copyright 2001-2018, Renishaw plc., Retrieved from the Internet: URL: http://www.renishaw.com/en/equator-gauging-explained—13465 [retrieved Jul. 23, 2018] pp. 1-5.

"Iterative closest point" Wikipedia, Retrieved from the Internet: URL: https://en.wikipedia.org/wiki/Iterative_closest_point [retrieved on Jul. 23, 2018] pp. 1-2.

"What is a Genetic Algorithm" YouTube Published on Sep. 23, 2015, Retrieved from the Internet: URL: https://www.youtube.com/watch?v=1i8muvzZkPw [retrieved on Jul. 23, 2018].

Polewski, P. et al., "Free Shape Context Descriptors Optimized with Genetic Algorithm for the Detection of Dead Tree Trunks in Als Point Clouds" ISPRS Annals of the Photogrammetry, Remote Sensing and Spatial Information Sciences, vol. II-3/W5, 2015 (8).

Wegrzyn, D., et al "A Genetic Algorithm-Evolved 3D Point Cloud Descriptor" Dept. of Computer Science, Univ. Beira Interior, We acknowledge the financial support of project PEst-OE/EEI/LA0008/2013. (8 pages).

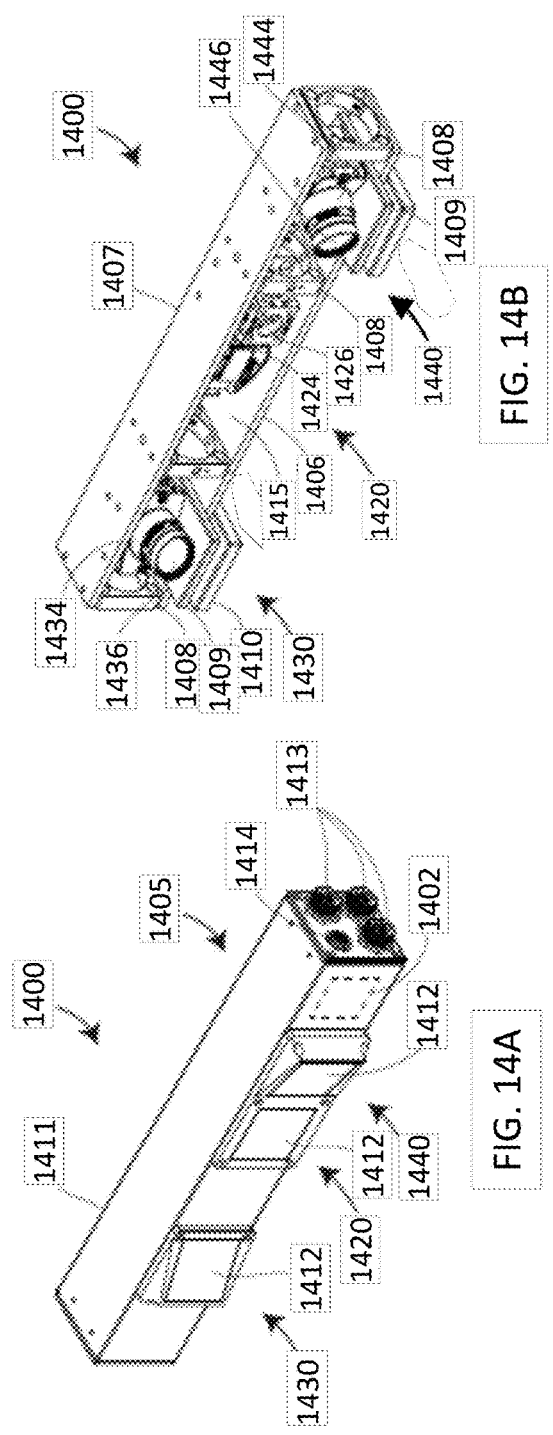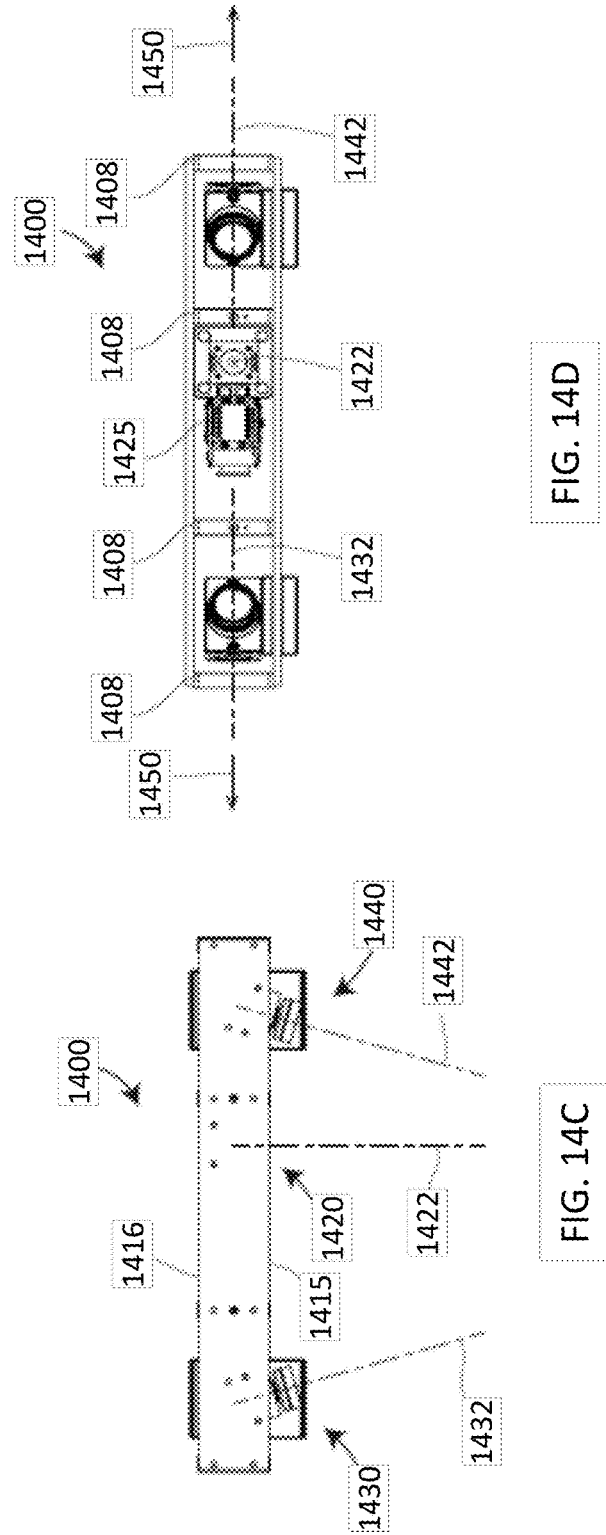

QUALITY INSPECTION SYSTEM AND METHOD OF OPERATION

CROSS REFERENCE TO RELATED APPLICATIONS

This application claims the benefit of U.S. Provisional application Ser. No. 16/139,896, filed Sep. 24, 2018, the entire disclosure of which is incorporated herein by reference.

BACKGROUND

The subject matter disclosed herein relates to systems for performing quality inspections on objects, such as manufactured goods or aircraft.

Measurement devices are often used in the inspection of objects to determine in the object is in conformance with specifications. When objects are large, such as with commercial aircraft for example, these inspections may be difficult and time consuming. To assist in these inspections, sometimes non-contact three-dimensional (3D) coordinate measurement devices are used in the inspection process.

One type of 3D measurement device is a 3D laser scanner time-of-flight (TOF) coordinate measurement device. A 3D laser scanner of this type steers a beam of light to a non-cooperative target such as a diffusely scattering surface of an object (e.g. the surface of the aircraft). A distance meter in the device measures a distance to the object, and angular encoders measure the angles of rotation of two axles in the device. The measured distance and two angles enable a processor in the device to determine the 3D coordinates of the target.

To measure large objects, such as aircraft, the TOF laser scanner is moved to multiple locations about the aircraft, either manually or with an automated system. A scan is performed at each location and the multiple scans are registered together to form a single scan of the object. It should be appreciated that this process may take considerable time. Further, once the scanning is completed, the data needs to be analyzed and the locations of any anomalies determined. Since the analysis is performed apart from the object, the actual location on the object needs to then be identified manually. Another time consuming process.

Accordingly, while existing 3D scanners are suitable for their intended purposes, what is needed is a 3D scanner having certain features of embodiments of the present invention.

BRIEF DESCRIPTION

According to one embodiment, an inspection system for measuring an object is provided. The inspection system includes an entryway sized to receive the object. At least two non-contact coordinate measurement devices are positioned with a field of view being at least partially within or adjacent to the entryway, each of the at least two non-contact coordinate measurement devices being operable to measure 3D coordinates for a plurality of points on the object as one of the object or the entryway move from a first position to a final position. A pose measurement device is operable to determine the six-degree of freedom (6DOF) pose of the object. One or more processors are provided that are responsive to executable computer instructions for registering the 3D coordinates for the plurality of points from each of the at least two non-contact coordinate measurement devices based at least in part on the 6DOF pose of the object.

In addition to one or more of the features described herein, or as an alternative, further embodiments of the inspection system may include the pose measurement device having a speed measurement device operably to measure a speed of the object. In addition to one or more of the features described herein, or as an alternative, further embodiments of the inspection system may include the 6DOF pose being determined based on the measured speed and a time measurement.

In addition to one or more of the features described herein, or as an alternative, further embodiments of the inspection system may include the object being moved through the entryway from the first position to the final position. In addition to one or more of the features described herein, or as an alternative, further embodiments of the inspection system may include the entryway moving from the first position to the final position.

In addition to one or more of the features described herein, or as an alternative, further embodiments of the inspection system may include at least one projector operable to emit a visible light onto a surface of the object. In addition to one or more of the features described herein, or as an alternative, further embodiments of the inspection system may include the pose measurement device being further operable to determine the position and orientation of the object in the final position.

In addition to one or more of the features described herein, or as an alternative, further embodiments of the inspection system may include the one or more processors being further responsive to executable computer instructions for determining the location of an anomaly on the surface of the object based at least in part on the 3D coordinates of the plurality of points. In addition to one or more of the features described herein, or as an alternative, further embodiments of the inspection system may include the one or more processors being further responsive to executable computer instructions for causing the at least one projector to emit the visible light onto the object based on the determination of the location of the anomaly.

In addition to one or more of the features described herein, or as an alternative, further embodiments of the inspection system may include the pose measurement device being a mobile scanning device that includes a time-of-flight scanner, the mobile scanning device being operable to move from an initial position and follow a path under the object when the object is in the final position, the mobile scanning device being further operable to measure 3D coordinates of a second plurality of points on the object and an environment while on the path.

In addition to one or more of the features described herein, or as an alternative, further embodiments of the inspection system may include the determination of the position and orientation of the object being based on comparing the 3D coordinates of the second plurality of points with an electronic model of the environment in which the object is located. In addition to one or more of the features described herein, or as an alternative, further embodiments of the inspection system may include the pose measurement device having at least two 3D LIDAR devices positioned to measure 3D coordinates of points on the object.

In addition to one or more of the features described herein, or as an alternative, further embodiments of the inspection system may include the speed measurement device having a camera operable to acquire a plurality of images as the object moves from the first position to the final position. In addition to one or more of the features described herein, or as an alternative, further embodiments of the inspection system may include the one or more processors are further responsive to executable computer instructions for determining the speed of the object based at least in part on the plurality of images.

In addition to one or more of the features described herein, or as an alternative, further embodiments of the inspection system may include the determining the speed of the object based at least in part on a change in position of features on the object in the plurality of images. In addition to one or more of the features described herein, or as an alternative, further embodiments of the inspection system may include the at least two non-contact measurement devices being time-of-flight measurement devices.

In addition to one or more of the features described herein, or as an alternative, further embodiments of the inspection system may include the at least two time-of-flight measurement devices having a first time-of-flight measurement devices that is located beneath a surface upon which the object is moved from the first position to the final position. In addition to one or more of the features described herein, or as an alternative, further embodiments of the inspection system the surface including a gap and the first time-of-flight measurement device being positioned to project light through the gap.

In addition to one or more of the features described herein, or as an alternative, further embodiments of the inspection system include the object being an aircraft. In addition to one or more of the features described herein, or as an alternative, further embodiments of the inspection system include the entryway being defined by a first frame. In addition to one or more of the features described herein, or as an alternative, further embodiments of the inspection system include a second frame movably coupled to the first frame, each of the at least two non-contact coordinate measurement devices being coupled to a different portion of the second frame.

In addition to one or more of the features described herein, or as an alternative, further embodiments of the inspection system include the pose measurement device having a camera operably coupled to at least one of the at least two non-contact coordinate measurement devices. In addition to one or more of the features described herein, or as an alternative, further embodiments of the inspection system include the at least two non-contact coordinate measurement devices being area scanners.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 14A, 14B, 14C and FIG. 14D are various views of an area scanner used with the inspection cells of FIG. 11 and FIG. 13.

The detailed description explains embodiments of the invention, together with advantages and features, by way of example with reference to the drawings.

DETAILED DESCRIPTION

Embodiments of the present disclosure relate to an inspection system that uses multiple three-dimensional (3D) scanners to determine 3D coordinates. Further embodiments relate to an inspection system that scans an object as the object is moved into the inspection system. Still further embodiments relate to an inspection system for an aircraft that scans the aircraft, locates anomalies, and indicates on the aircraft where the anomalies are located. Embodiments of the disclosure provide advantages in reducing the time and improving the accuracy of inspecting objects.

Figure 1:
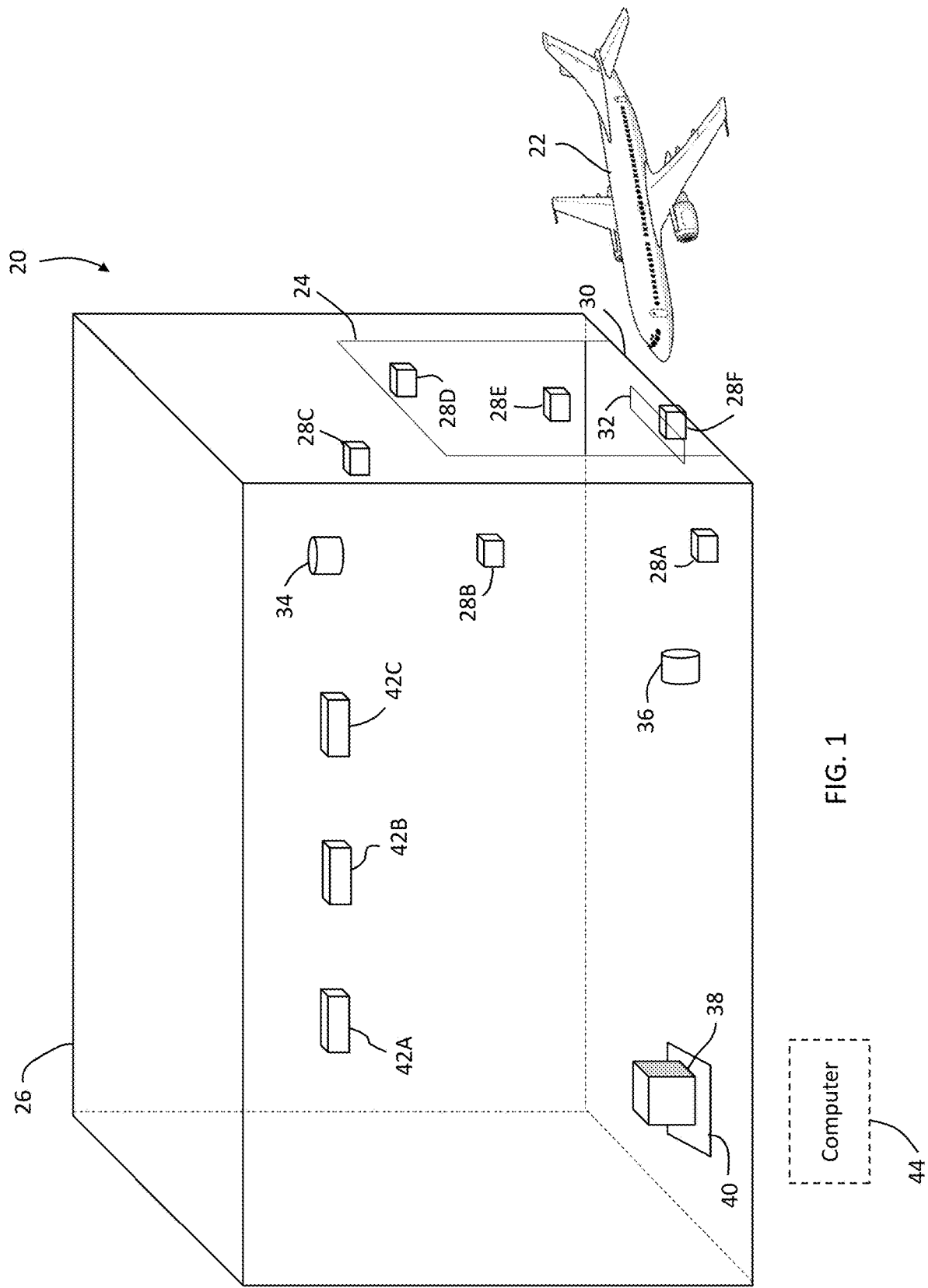
FIG. 1 is a perspective view of an inspection system in accordance with an embodiment.
Figure 2:
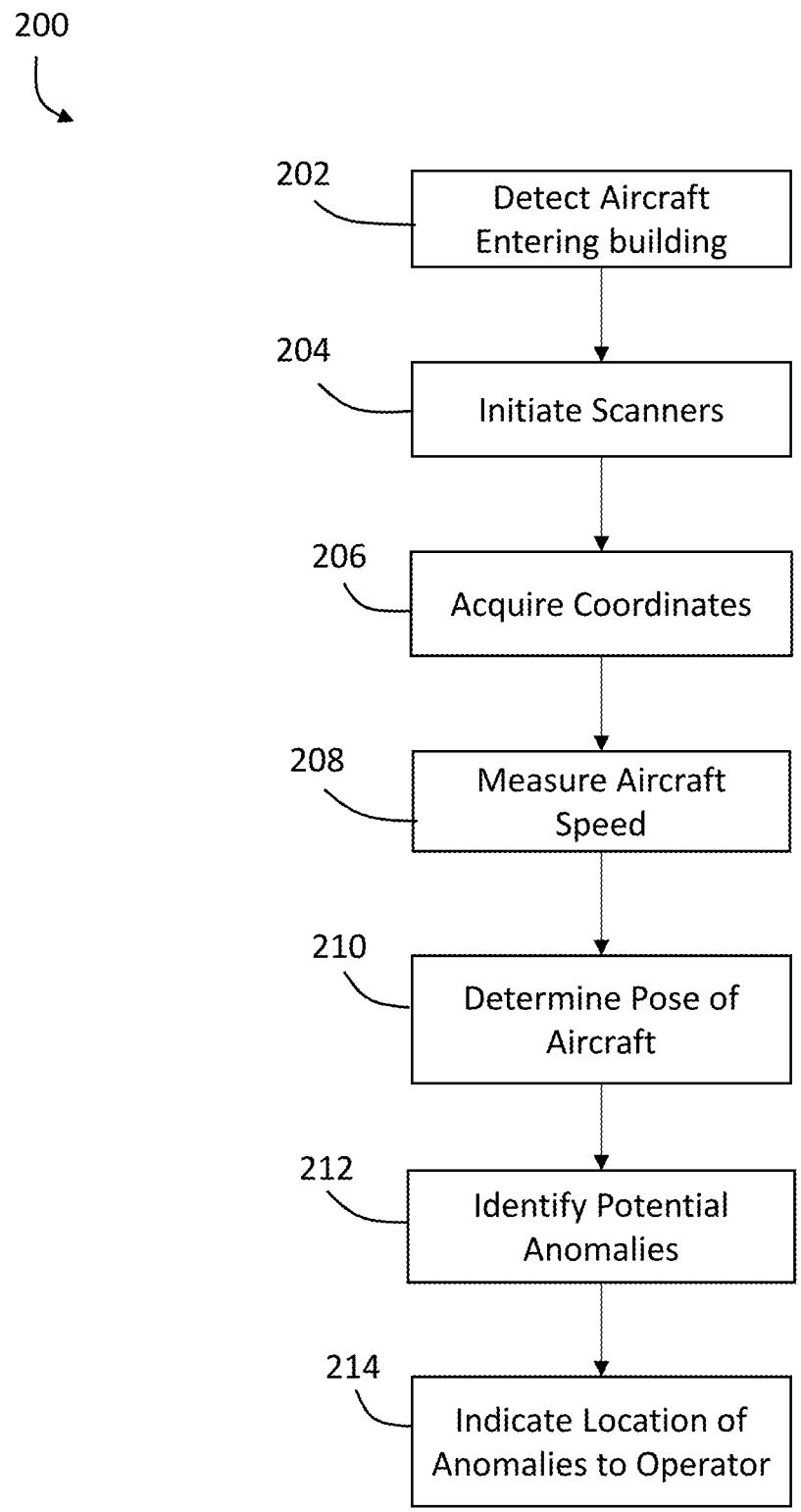
FIG. 2 is a flow diagram of a method of inspecting large objects with the inspection system of FIG. 1.
Figure 3:
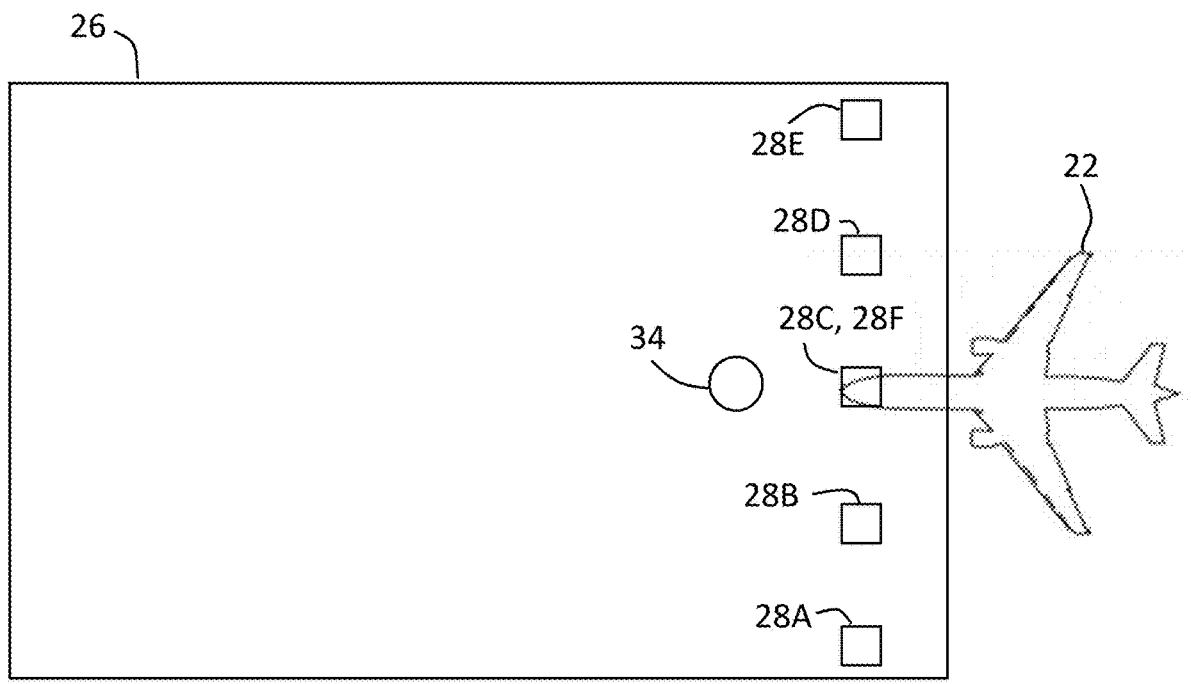
FIG. 3 is a plan view of the inspection system of FIG. 1 with an aircraft being inspected.
Figure 4:
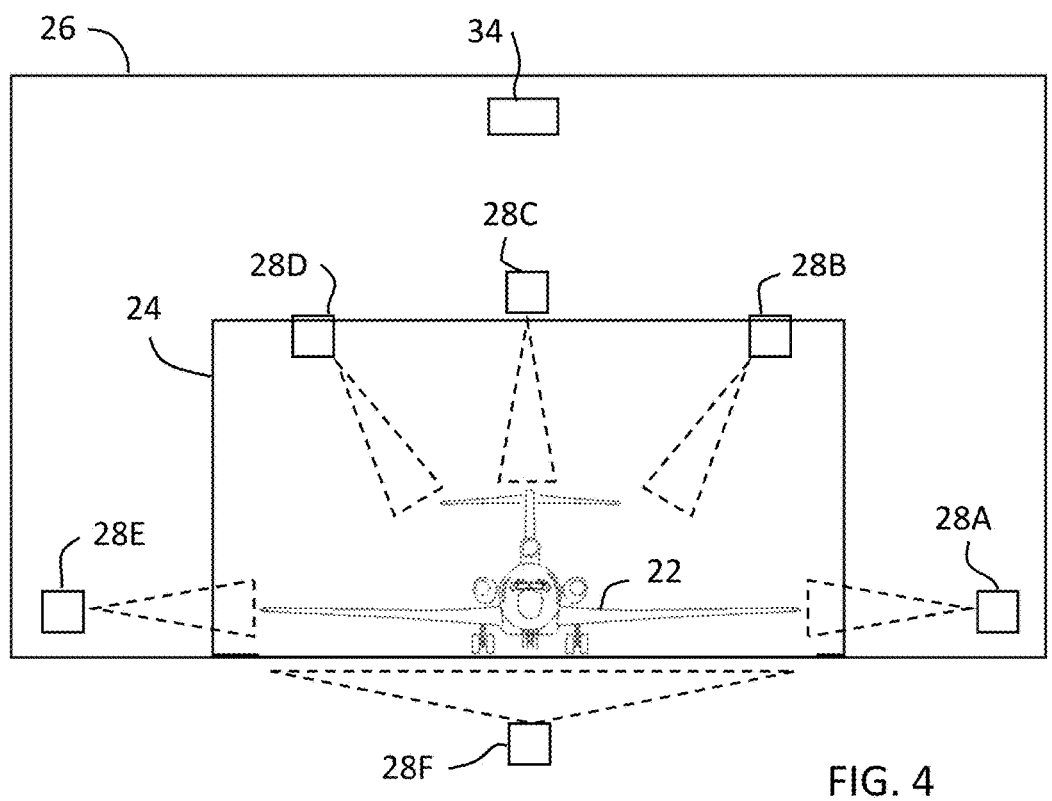
FIG. 4 is an elevation view of the inspection system of FIG. 1 with an aircraft being inspected.

Referring now to FIG. 1, an embodiment is shown of an inspection system 20 for inspecting objects, such as an aircraft 22 for example. It should be appreciated that while embodiments herein may refer to the object being inspected as being an aircraft, this is for exemplary purposes and the claims should not be so limited. In other embodiments, other objects may be inspected, such as but not limited to: automobiles, trucks, ships, helicopters, trains, space vehicles, pre-fabricated housing and the like. Further, as described in more detail herein, the inspection system 20 may be used for inspecting smaller objects and integrated into an assembly line.

The inspection system 20 includes an entryway 24. In the illustrated embodiment, the entryway 24 is an opening in a building 26, such as an aircraft hangar for example. Adjacent the entryway 24 is a plurality of 3D measurement devices, such as laser scanners 28A, 28B, 28C, 28D, 28E, 28F. In an embodiment, the laser scanners 28A-28F are TOF laser scanners, such as the one described with respect to in FIGS. 7-9. In an embodiment, one of the laser scanners 28F is located below the floor level 30 and projects light through an opening 32 in the floor 30. In an embodiment, the opening has a width of about 10 centimeters and the laser scanners 28A-28F are operated in a helical mode where the mirror 26 is rotated and the measurement head 22 is fixed (nonrotating) in a position that is perpendicular to the entryway 24. The operation of the laser scanners 28A-28F in helical mode projects the light in a plane that is substantially parallel to the entryway 24 (approximately perpendicular to the direction of motion of the aircraft 22). It should be appreciated that while the illustrated embodiment shows six laser scanners 28A-28F, this is for exemplary purposes and the claims should not be so limited. In other embodiments, more or fewer laser scanners may be used.

In an embodiment, the system 20 further includes one or more speed detection devices 34, 36. In the illustrated embodiment, the speed detection device 34 is a camera, such as an RGB camera that is mounted above the space where the aircraft 22 will travel after passing through the entryway 24. The camera 34 is positioned such that the camera 34 has a field view that includes a portion of the floor 30 and the entryway 24. Since the camera 34 position is static and the overall building 26 does not change considerably over time, the background may be segmented out and obstacles identified by using the difference between consecutive frames or by applying a sliding window method. With the background segmented out and dynamic obstacles being identified frame by frame, the aircraft 22 may be detected in the image due to the aircrafts dimension and shape. By calibrating the camera 34 the speed of the aircraft 22 may be estimated as well as the direction of the movement. In an embodiment, the direction is assumed to be perpendicular to the entryway 24. As discussed below, since the field of view of camera 34 includes the entryway 24, the presence of a dynamic object may be used initiate operation of the laser scanners 28A-28F.

In an embodiment, the speed detection devices 36 is a laser range finder device. In this embodiment, a reflective target is attached to the aircraft 22, such as on the landing gear above the wheels. The range finder 36 is placed to direct light onto the target and measure the distance on a periodic or aperiodic basis. These measurements may be used to estimate the speed of the aircraft. It should be appreciated that the range finder 36 may provide more accurate speed measurements than a camera 34.

In an embodiment, infrared LEDs are mounted on the aircraft 222 before the aircraft 22 passes through the entryway 24. The LEDs allow more accurate tracking of the aircraft 22 with the camera 34, which enables the registration of all the data obtained in helical mode.

In an embodiment, the system 20 further includes a mobile scanning device 38. The mobile scanning device 38 may include a docking station 40 that is in a known fixed position within the building 26. The docking station 40 may be used to recharge the mobile scanning device 38 for example. Further, since the docking station 40 is in a known fixed position, cumulative errors in the mapping and localization system of the mobile scanning device 38 are reduced and the overall accuracy of the scan registration is improved.

Figure 7:
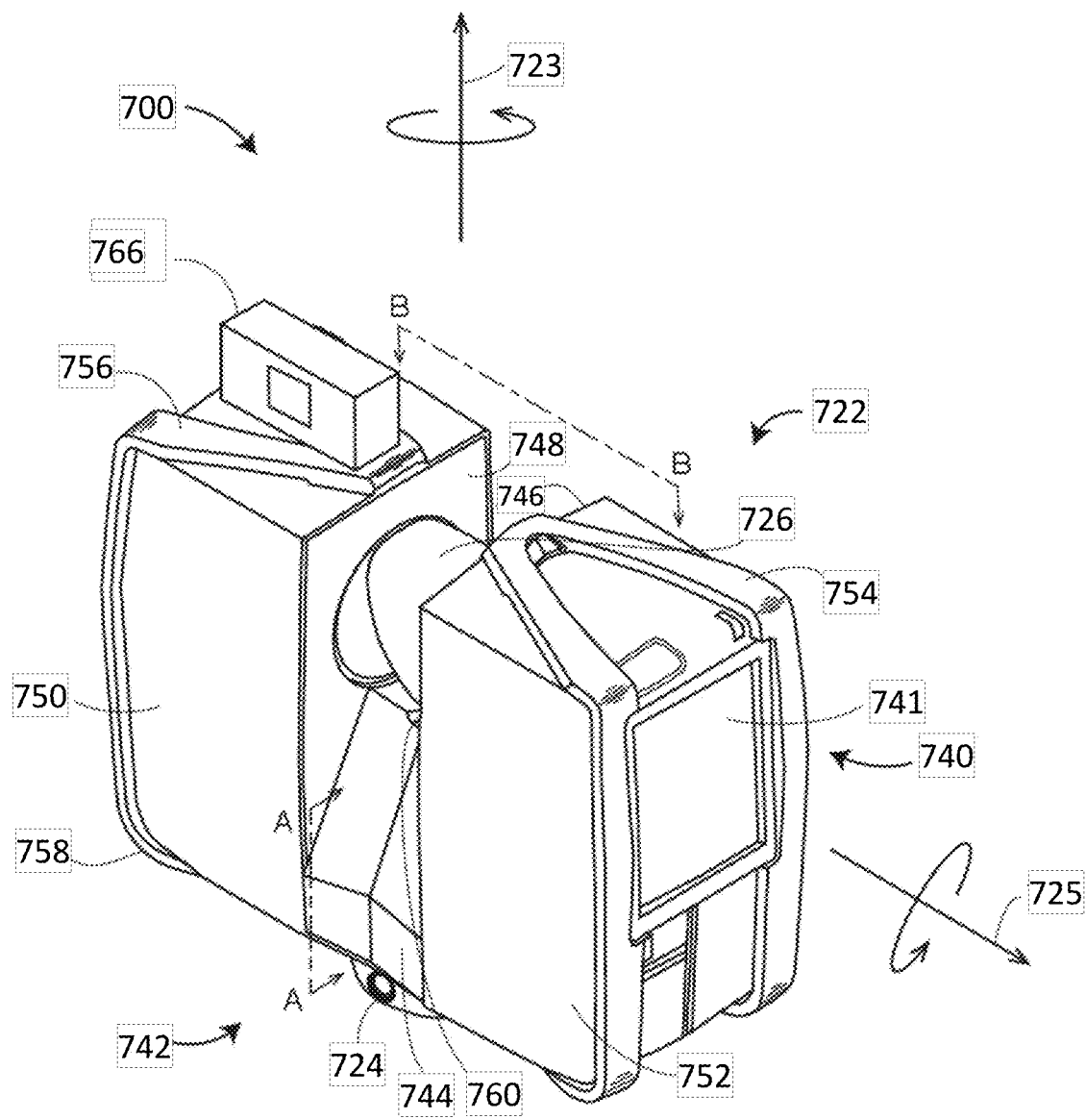
FIG. 7 is a perspective view of a laser scanner for use in the inspection system of FIG. 1 in accordance with an embodiment.
Figure 8:
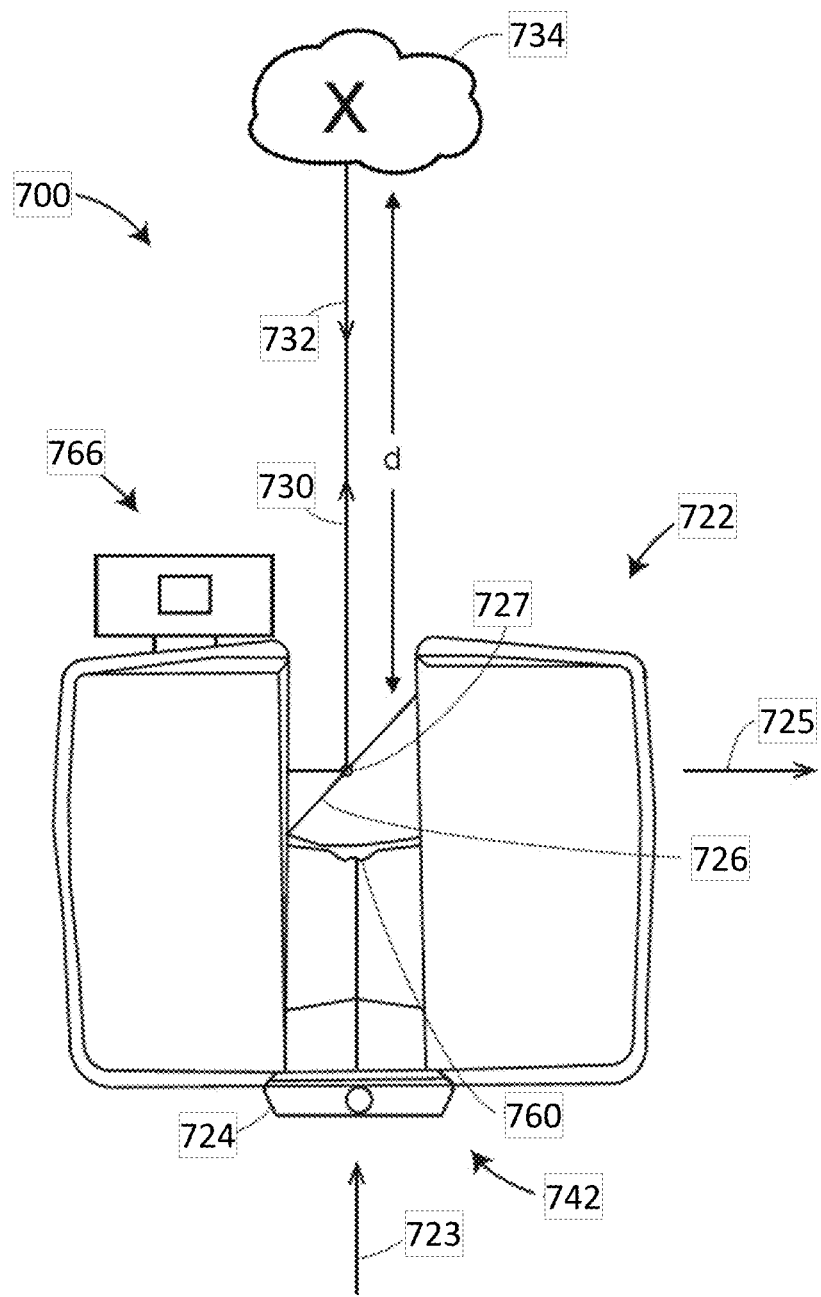
FIG. 8 is a side view of the laser scanner of FIG. 7 illustrating a method of measurement according to an embodiment.
Figure 9:
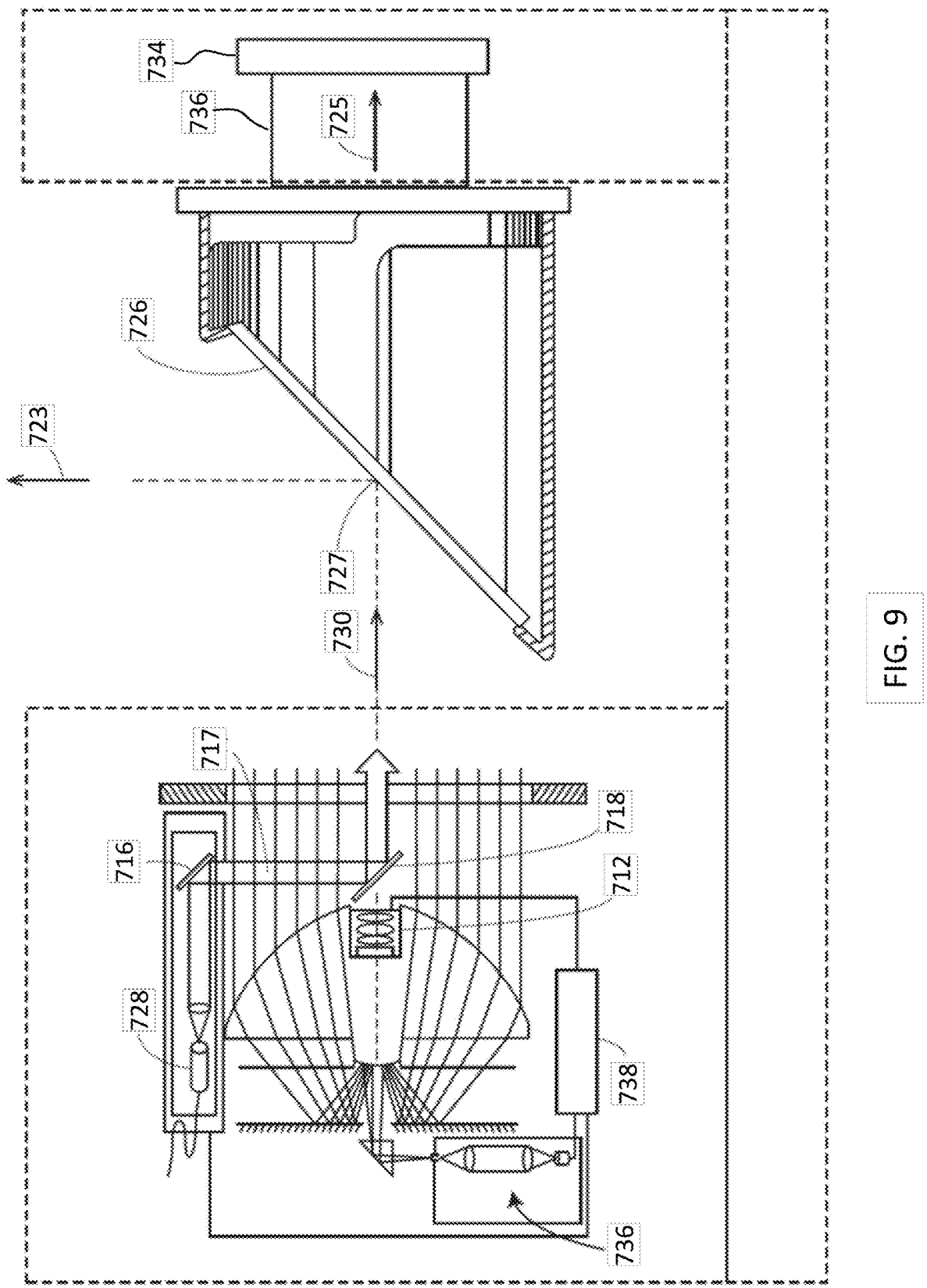
FIG. 9 is a schematic illustration of the optical, mechanical, and electrical components of the laser scanner of FIG. 7 according to an embodiment.

The mobile scanning device 38 includes a laser scanning device, such as the one described with respect to FIG. 7-FIG. 9. In an embodiment, the mobile scanning device 38 is the system described in commonly owned PCT Patent Publication WO2014/068406, the contents of which are incorporated by reference herein. In one embodiment, the mobile scanning device 38 replaces the laser scanner 28F. In this embodiment, once the aircraft 22 is in a final position (FIG. 5), the mobile scanning device 38 moves under the aircraft 22 to a plurality of locations to scan the underside of the aircraft 22. In order to register all scans performed by the mobile scanning device 38, with the scans acquired by the static laser scanners 28A-28E, the characteristic shape of the aircraft (wings shape and nose) to register all the scans together and achieve a complete 3D model of the aircraft. In other embodiments, other features, such as calibration spheres for example, can be used for the point cloud registration. An advantage of this embodiment is that it can be used to find the pose aircraft 22 within the building 26.

The system 20 further includes a plurality of projectors 42A, 42B, 42C that are fixed mounted in known locations above the final position of the aircraft 22. It should be appreciated that while the illustrated embodiment shows three projectors 42A, 42B, 42C, this is for exemplary purposes and the claims should not be so limited. In other embodiments, the system 20 may include more or fewer projectors. The projectors 42A, 42B, 42C are configured to project a visible light onto a surface and trace the light into a pattern to indicate a location on the aircraft 22. In an embodiment, the projectors 42A, 42B, 42C are the laser projectors described with respect to FIG. 10. In an embodiment, the projectors 42A, 42B, 42C are the laser projector described in commonly owned U.S. Pat. No. 9,410,793, the contents of which are incorporated by reference herein.

Referring now to FIGS. 2-6, with continuing reference to FIG. 1, a method 200 is shown for scanning an object, such as the aircraft 22, identifying anomalies on the surface of the object and providing an indication of the location of the anomaly on the object. The method 200 begins in block 202 where the aircraft 22 is detected at the entryway 24. The aircraft 22 may be movable under its own power, or be towed by another vehicle. The detection of the aircraft 22 may be performed by the camera 34, the range finder 36, the infrared LEDs or a combination of the foregoing as described herein. Upon detecting the aircraft 22, the method 200 proceeds to block 204 where the laser scanners 28A-28F are initiated. As the aircraft 22 is moved further into the building 26, past the plane of light emitted by the laser scanners 28A-28F (FIG. 3, FIG. 4), 3D coordinates of points on the surface of the aircraft 22 are acquired in block 206.

Figure 5:
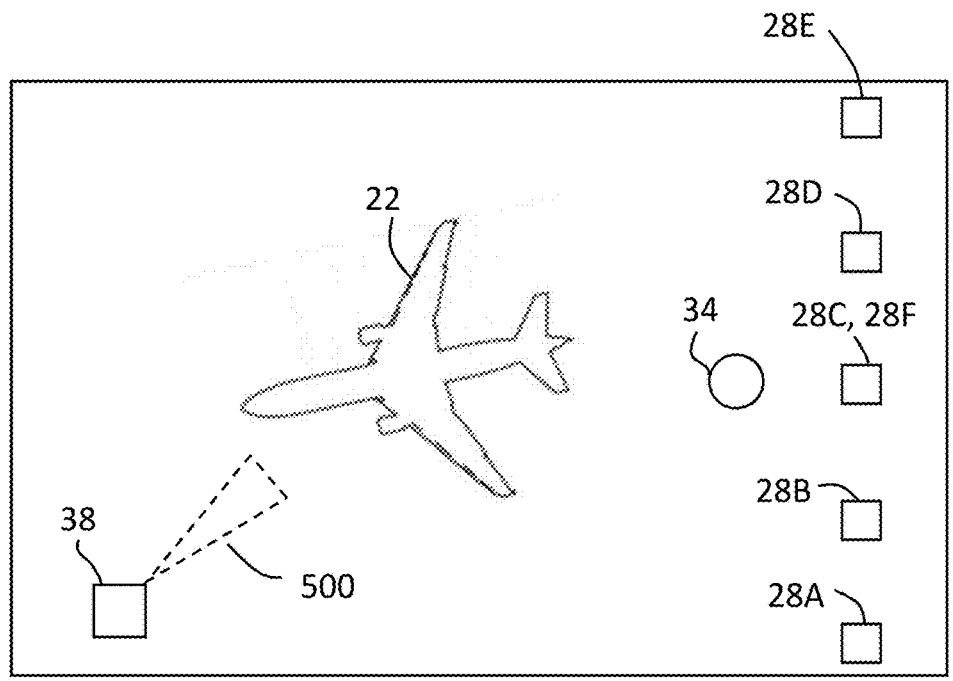
FIG. 5 is a plan view of the inspection system of FIG. 3 with the aircraft with a final position or pose being determined.
Figure 6:
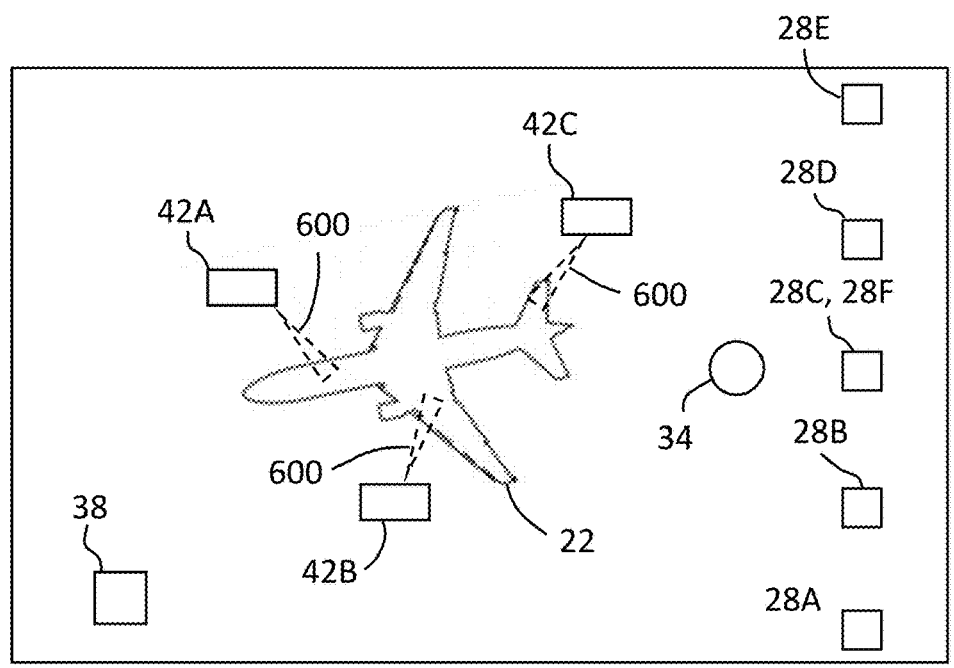
FIG. 6 is a plan view of the inspection system of FIG. 5 with the anomalies being indicated on the aircraft.

The method 200 proceeds to block 208 where the aircraft 22 speed is measured. In an embodiment, the speed of the aircraft 22 is continuously measured as the aircraft 22 moves through the entryway 24 to its final position (FIG. 5, FIG. 6). In other words, while the method 200 is illustrated as being a series of serial steps, one or more of the steps may be performed simultaneously, such as the measurement of the aircraft speed and the acquisition of 3D coordinates for example. The method 200 then proceeds to block 210 where the final position and pose of the aircraft 22 is determined.

In an embodiment, a scan of the building 26 (e.g. empty) and a 3D model of the building 26 is generated. Then, in an embodiment where the mobile scanning device 38 is used project and receive light 500 (FIG. 5) to scan the bottom part of the plane, these scans of the underside of the aircraft may be registered with the 3D model of the building 26, which allows the pose of the aircraft 22 in the building 26 to be obtained. In an embodiment, the light 500 may be a pattern of light that is projected onto the surface of the aircraft and an image of the pattern of light is acquired by a camera on the scanning device 38 (e.g. a structured light scanner or a triangulation scanner). In another embodiment, the light 500 is reflected off of the surface of the aircraft and received by the mobile scanning device 38, where the coordinates of the surface are based at least in part on the time of flight of the light 500 (e.g. a time-of-flight scanner). In still another embodiment, the light 500 is projected by a laser line probe. In an embodiment, to improve the overall accuracy of the 3D coordinate (point cloud) registration, plurality of calibration spheres may be mounted over the building 26 ceiling and walls. In still another embodiment, the camera 34 is used to track the position of the mobile scanning device 38 while performing the different scans. The mobile scanning device 38 may have a visual marker, to facilitate tracking by the camera 34. In still another embodiment, the pose of the aircraft 22 in the building 26 uses two 3D LIDARs mounted on both sides of the hangar to detect the aircraft 22 position. Due to the aircraft dimension and shape, the pose of the aircraft 22 may be identified and tracked by the data of the 3D LIDARs. An example of a suitable 3D LIDAR is the Velodyne Puck manufactured by Velodyne LiDAR of San Jose, Calif.

With the pose of the aircraft 22 determined, the method 200 proceeds to block 212 where the scan data, from the laser scanners 28A-28F, the mobile scanning device 38 and the pose data is registered together using one or more computers 44. The computers 44 may be positioned locally (e.g. in or near the building 26) or be remotely connected via a network. In an embodiment, the computer 44 is a distributed computing system (e.g. a cloud computing system) comprised of a plurality of nodes that may be remotely located from the building 26 and from each other. In an embodiment, the computer 44 includes one or more processors that are responsive to executable computer instructions for registering the data and determining the pose of the aircraft 22 within the building 26.

With the point cloud data registered, the surfaces of the aircraft 22 are analyzed to determine anomalies or deviations from an expected surface. In an embodiment, the registered point cloud data is compared to a model, such as a computer aided design (CAD) model. In another embodiment, the registered point cloud data is compared with a point cloud data of the aircraft 22 that was acquired at an earlier point in time. In an embodiment, the anomalies or deviations may include dents, holes, cracks, and deformations for example. In an embodiment, the analysis of the aircraft may be performed using the methods described in commonly owned U.S. Patent Application Ser. No. 62/589,126 filed on Nov. 21, 2017 entitled "System for Surface Analysis and Method Thereof", the contents of which are incorporated herein by reference.

The method 200 then proceeds to block 214 where the anomalies or deviations are indicated to the operator. In the illustrated embodiment, the projectors 42A, 42B, 42C project a laser light 600 (FIG. 6) on to the aircraft 22 at the location where the anomaly or defect is located. It should be appreciated that since the location of the projectors 42A, 42B, 42C are known within the building 26 and the pose (e.g. position and orientation) of the aircraft 22 is known, the projectors 42A, 42B, 42C can project an indicator light onto the surface of the aircraft where the defect is located. In an embodiment, the indicator may be a trace of a light pattern (e.g. a circle or a square) around the border of the determined anomaly or defect.

It should be appreciated that method 200 provides advantages in decreasing the time for inspectors to inspect an object, such as aircraft 22, and locate the position of any defects on the object.

Referring now to FIGS. 7-9, an embodiment is shown of a laser scanner 700. In this embodiment, the laser scanner 700 has a measuring head 722 and a base 724. The measuring head 722 is mounted on the base 724 such that the laser scanner 700 may be rotated about a vertical axis 723. In one embodiment, the measuring head 722 includes a gimbal point 727 that is a center of rotation about the vertical axis 723 and a horizontal axis 725. The measuring head 722 has a rotary mirror 726, which may be rotated about the horizontal axis 725. The rotation about the vertical axis may be about the center of the base 724. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 722 is further provided with an electromagnetic radiation emitter, such as light emitter 728, for example, that emits an emitted light beam 730. In one embodiment, the emitted light beam 730 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 730 is amplitude or intensity modulated, for example, with a sinusoidal waveform or with a rectangular waveform. The emitted light beam 730 is emitted by the light emitter 728 onto a beam steering unit, such as mirror 726, where it is deflected to the environment. A reflected light beam 732 is reflected from the environment by an object 734. The reflected or scattered light is intercepted by the rotary mirror 726 and directed into a light receiver 736. The directions of the emitted light beam 730 and the reflected light beam 732 result from the angular positions of the rotary mirror 726 and the measuring head 722 about the axes 725, 723, respectively. These angular positions in turn depend on the corresponding rotary drives or motors.

Coupled to the light emitter 728 and the light receiver 736 is a controller 38. The controller 738 determines, for a multitude of measuring points X, a corresponding number of distances d between the laser scanner 700 and the points X on object 734. The distance to a particular point X is determined based at least in part on the speed of light in air through which electromagnetic radiation propagates from the device to the object point X. In one embodiment the phase shift of modulation in light emitted by the laser scanner 700 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 700 takes place by rotating the rotary mirror 726 relatively quickly about axis 725 while rotating the measuring head 722 relatively slowly about axis 723, thereby moving the assembly in a spiral pattern. In an exemplary embodiment, the rotary mirror rotates at a maximum speed of 5820 revolutions per minute. For such a scan, the gimbal point 727 defines the origin of the local stationary reference system. The base 724 rests in this local stationary reference system.

In addition to measuring a distance d from the gimbal point 727 to an object point X, the scanner 700 may also collect gray-scale information related to the received optical power (equivalent to the term "brightness.") The gray-scale value may be determined at least in part, for example, by integration of the bandpass-filtered and amplified signal in the light receiver 736 over a measuring period attributed to the object point X.

The measuring head 722 may include a display device 740 integrated into the laser scanner 700. The display device 740 may include a graphical touch screen 741, which allows the operator to set the parameters or initiate the operation of the laser scanner 700. For example, the screen 741 may have a user interface that allows the operator to provide measurement instructions to the device, and the screen may also display measurement results.

The laser scanner 700 includes a carrying structure 742 that provides a frame for the measuring head 722 and a platform for attaching the components of the laser scanner 700. In one embodiment, the carrying structure 742 is made from a metal such as aluminum. The carrying structure 742 includes a traverse member 744 having a pair of walls 746, 748 on opposing ends. The walls 746, 748 are parallel to each other and extend in a direction opposite the base 724. Shells 750, 752 are coupled to the walls 746, 748 and cover the components of the laser scanner 700. In the exemplary embodiment, the shells 750, 752 are made from a plastic material, such as polycarbonate or polyethylene for example. The shells 750, 752 cooperate with the walls 746, 748 to form a housing for the laser scanner 700.

On an end of the shells 750, 752 opposite the walls 746, 748 a pair of yokes 754, 756 are arranged to partially cover the respective shells 750, 752. In the exemplary embodiment, the yokes 754, 756 are made from a suitably durable material, such as aluminum for example, that assists in protecting the shells 750, 752 during transport and operation. The yokes 754, 756 each includes a first arm portion 758 that is coupled, such as with a fastener for example, to the traverse 744 adjacent the base 724. The arm portion 758 for each yoke 754, 756 extends from the traverse 744 obliquely to an outer corner of the respective shell 750, 752. From the outer corner of the shell, the yokes 754, 756 extend along the side edge of the shell to an opposite outer corner of the shell. Each yoke 754, 756 further includes a second arm portion that extends obliquely to the walls 746,748. It should be appreciated that the yokes 754, 756 may be coupled to the traverse 742, the walls 746, 748 and the shells 750, 754 at multiple locations.

In an embodiment, on top of the traverse 744, a prism 760 is provided. The prism extends parallel to the walls 46, 48. In the exemplary embodiment, the prism 760 is integrally formed as part of the carrying structure 742. In other embodiments, the prism 760 is a separate component that is coupled to the traverse 744. When the mirror 726 rotates, during each rotation the mirror 726 directs the emitted light beam 730 onto the traverse 744 and the prism 760. Due to non-linearities in the electronic components, for example in the light receiver 736, the measured distances d may depend on signal strength, which may be measured in optical power entering the scanner or optical power entering optical detectors within the light receiver 736, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 736. Since the prism 760 is at a known distance from the gimbal point 727, the measured optical power level of light reflected by the prism 760 may be used to correct distance measurements for other measured points, thereby allowing for compensation to correct for the effects of environmental variables such as temperature. In the exemplary embodiment, the resulting correction of distance is performed by the controller 738.

In an embodiment, the base 724 is coupled to a swivel assembly (not shown) such as that described in commonly owned U.S. Pat. No. 8,705,012 ('012), which is incorporated by reference herein. The swivel assembly is housed within the carrying structure 742 and includes a motor that is configured to rotate the measuring head 722 about the axis 723. In an embodiment, the angular/rotational position of the measuring head 22 about the axis 23 is measured by angular encoder.

An auxiliary image acquisition device 766 may be a device that captures and measures a parameter associated with the scanned area or the scanned object and provides a signal representing the measured quantities over an image acquisition area. The auxiliary image acquisition device 766 may be, but is not limited to, a pyrometer, a thermal imager, an ionizing radiation detector, or a millimeter-wave detector. In an embodiment, the auxiliary image acquisition device 766 is a color camera.

In an embodiment, a central color camera (first image acquisition device) 712 is located internally to the scanner and may have the same optical axis as the 3D scanner device. In this embodiment, the first image acquisition device 712 is integrated into the measuring head 722 and arranged to acquire images along the same optical pathway as emitted light beam 730 and reflected light beam 732. In this embodiment, the light from the light emitter 728 reflects off a fixed mirror 716 and travels to dichroic beam-splitter 718 that reflects the light 717 from the light emitter 728 onto the rotary mirror 726. In an embodiment, the mirror 726 is rotated by a motor 736 and the angular/rotational position of the mirror is measured by angular encoder 734. The dichroic beam-splitter 718 allows light to pass through at wavelengths different than the wavelength of light 717. For example, the light emitter 728 may be a near infrared laser light (for example, light at wavelengths of 780 nm or 1150 nm), with the dichroic beam-splitter 718 configured to reflect the infrared laser light while allowing visible light (e.g., wavelengths of 400 to 700 nm) to transmit through. In other embodiments, the determination of whether the light passes through the beam-splitter 718 or is reflected depends on the polarization of the light. The digital camera 712 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 723 and by steering the mirror 726 about the axis 725.

Figure 10:
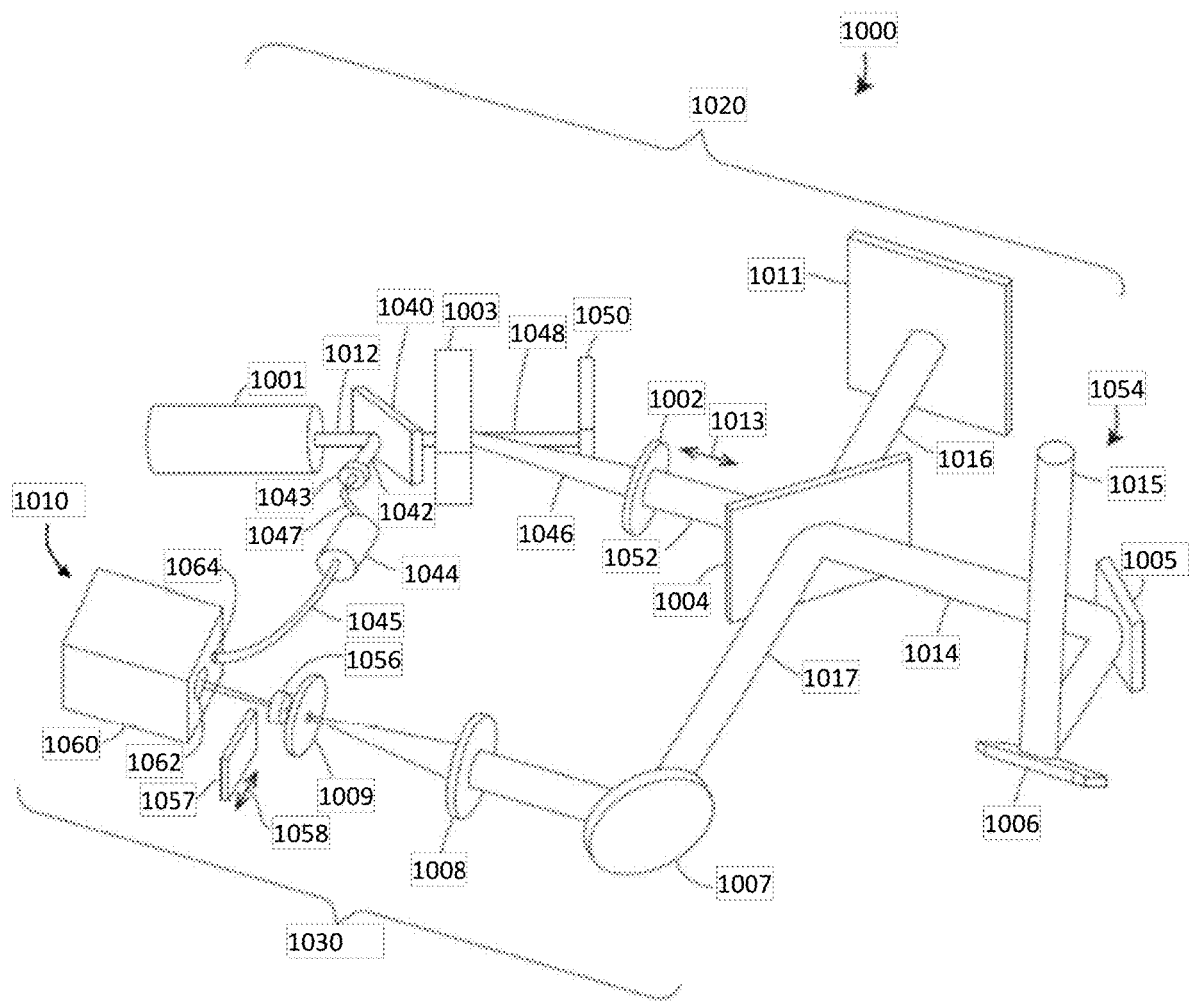
FIG. 10 is a schematic illustration of a laser projector system for use in the inspection system of FIG. 1 in accordance with an embodiment.

Referring now to FIG. 10, an embodiment is shown of a laser radar projector system 1000. The system 700 emits a light beam onto a surface of an object (e.g. aircraft 22) in the environment. In some embodiments, the light beam is traced over a predetermined path at a rapid rate to generate a template or a light pattern on the surface of the object 22. The system 1000 is also operable to measure the distance from the system 1000 to the surface of object 22. In some embodiment, the system 1000 may also determine the three-dimensional coordinates of points on the surface. The laser radar projector system 1000 includes a projection subsystem 1020 and a feedback subsystem 1030. The projection subsystem 1020 includes a light source 1001, such as a laser light source that is operable to emit pulses of laser light at a rate of 50 kHz to 100 kHz. The light of laser source 1001 is used in both functions of the system 1000: laser projection and non-contact 3D measurement by scanning and ranging. In an embodiment, the light source 1001 emits a light 1012 at a green wavelength of 532 nanometers and has a pulse duration of about 250-500 picoseconds. The light beam 1012 emitted from laser 1001 may have a diameter of about 0.4 to 1.0 millimeters. In an embodiment, the average output power of the laser 1001 is about 25 to 30 milliwatts that is adequate, after power losses in the system, to provide the average power of the output beam 1015 up to 5 milliwatts. Output laser beam average power of the system 1000 within 5 milliwatts corresponds to the Laser Safety Class 3R according to the International Standard IEC 60825-1. In another embodiment, the system 1000 could have an output average beam power within 1 milliwatt that corresponds to the Laser Safety Class 3R of International Standard IEC 60825-1.

The light source 1001 emits a pulsed light beam 1012 that strikes a beam splitter 1040. The beam splitter 1040 reflects a reference light portion 1042 of the light beam 1012 towards an attenuator 1044. In an embodiment, some of the light 1042 reflected by the beam splitter 1040 passes through a lens 1043 that focuses the light into the optical fiber 1047. In the exemplary embodiment, the beam splitter 1040 reflects about 1% of the light 1012 towards the attenuator 1044. In the exemplary embodiment, the beam splitter may be a Beam Sampler manufactured by THORLABS, INC. of Newton, N.J. The optical fiber 1047 is preferably a single mode type of fiber. A single mode fiber, for example, for a green light, has the fiber core about 4 micrometers in diameter. The light from the fiber 1047 travels through the attenuator 1044, through an output fiber 1045 and is launched into the detector body 1060 via an opening 1064. In the exemplary embodiment, the attenuator 1044 is a variable micro-electromechanical-system (MEMS) such as that manufactured by DICON FIBEROPTICS, INC. of Richmond, Calif. for example. It should be appreciated that other types of optical attenuators may also be used provided that they allow to reduce the optical power of the reference light 1042, these attenuators include but are not limited to different kind of variable attenuators, such as loopback attenuators, liquid crystal variable attenuators, electro-optical and acousto-optical attenuators and alike. As will be discussed in more detail herein, the attenuator 1044 changes the optical power of the reference light 1042 to be similar or substantially equal to the optical power of the feedback light beam that is reflected from the surface of object 22. This provides advantages in maintaining a similar dynamic range of signals at the optical sensor 1010 between the reference light beam and the feedback light beam. As will be discussed in more detail herein, the output of the attenuator 1044 is a fiber optic cable 1045 that routes the reference light beam to an opening 1064 in the detector body that allows the light to strike an optical sensor.

The light that passes through the beam splitter 1040 is directed toward an acousto-optical modulator (AOM) 1003. The AOM 1003 serves as a beam shutter and attenuator thus adjusting the power of the output beam 1015 directed toward the object 22. In an embodiment, the AOM 1003 works similar to that described by Xu, Jieping and Stroud, Robert, Acousto-optic Devices: principles, design and applications, John Willey & Sons, Inc., 1992, the contents of which are incorporated by reference herein. In an embodiment, the AOM 1003 is an AO Frequency Shifter Model 1205-1118 manufactured by ISOMET CORP. of Springfield, Va. USA. The AOM 1003 splits the incoming laser light beam into a first order beam 1046 and a zero-order beam 1048. The intensity or optical power of the first order beam 1046 depends on a control signal transmitted from a controller to the AOM 1003. Depending on a control signal, part of the incoming light is redirected from zero-order 1048 to the first order 1046. Therefore, the intensity of the first order beam 1046 may be varied based on the control signal. In an embodiment, the zero-order beam 1048 is directed into a plate 1050. In an embodiment, when no control signal is provided to the AOM 1003, substantially all of the incoming light beam is being blocked by the plate 1050.

The first order beam 1046 further passes through a beam expander/collimator 1002 which outputs a light beam 1052. The beam expander 1002 typically consists of two lenses (not shown in FIG. 10) collimating the beam 1046 and expanding its diameter about 10 to 15 times. The output lens of the beam expander 1002 may be moved in the directions indicated by arrow 1013 to allow adjustment of the size and convergence of the beam 1052 (and, therefore, the beam 1015) thus focusing the output beam 1015 as a cone of light into a focused laser spot on the surface of the object 22. In an embodiment, the beam expander 1002 is coupled to a motor (not shown). This allows the signal light beam 1015 to be focused onto a desired focusing point as a cone. The light beam 1052 that is coming out of the beam expander 1002 is directed toward the beam splitter 1004. The beam splitter 1004 reflects a portion of the light beam 1052 as light beam 1016. The light beam 1016 strikes a beam dump 1011 and it dissipated. The remainder of the light beam 1052 passes through the beam splitter and proceeds as signal light beam 1014. The signal light beam 1014 proceeds to steering system 1054. The steering system 1054 directs the signal light beam 1015 from the system 1000 towards the object 22. In the exemplary embodiment, the steering system 1054 includes a first mirror 1005 and a second mirror 1006. As discussed in more detail herein, the mirrors 1005, 1006 each are coupled to a galvanometer that allows the selective changing of the angle of the mirror relative to the incoming light beam to allow the changing of the direction of the signal light beam 1015. It should be appreciated that the use of mirrors with galvanometers is for exemplary purposes and the claims should not be so limited. In other embodiments, the steering system 1054 may include a rotating mirror that rotates about an axis that is substantially collinear with the optical axis of the light beam 1014. In still other embodiments, the steering system 1054 includes a gimbal arrangement that is rotatable about a pair of orthogonal axes. In this arrangement, the signal light beam 1015 may be emitted directly from the beam splitter 1004. In yet another embodiment the beam steering system may be based on electro-optical phase array.

In operation the signal light beam 1015 is emitted from the system 1000 converges into a cone and strikes the surface on the object 22. In this embodiment, the signal light beam 1015 is focused on a spot. Typically, the surface reflects the light diffusely, and the reflected light is directed widely back towards the system 1000. It should be appreciated that a portion of this reflected light, referred to herein as the feedback light beam, is directed back towards the system 1000. In the embodiment of FIG. 10, the feedback light beam enters the system 1000 via the mirrors 1006, 1005 and into the optical feedback subsystem 1030. The feedback light beam is transmitted towards the beam splitter 1004 along the same optical path as light beam 1014. The feedback light beam is reflected off of the beam splitter 1004 as light beam 1017 towards mirror 1007 which decouples the feedback light beam from the shared path with light beam 1014. The light beam 1017 further passes through a focusing lens 1008 and spatial filter 1009. The feedback light beam 1017 then passes through a beam size lens 1056 before passing through an opening 1062 in the detector body 1060 and striking the optical sensor. In an embodiment, the optical sensor is a photomultiplier tube or a hybrid photo detector such as Model R10467U-40 or Model R11322U-40 high speed compact hybrid photo detector manufactured by HAMAMATSU PHOTONICS K.K. of Iwata City, Japan. In an embodiment, a neutral density filter 1057 is movable in the direction 1058 into or out of the optical path of feedback light beam between the beam size lens 1056 and the opening 1062. In an embodiment, insertion of the neutral density filter 1057 into the optical path based on the brightness of the feedback light beam.

In an embodiment, the lens 1008, spatial filter 1009 and beam dump 1011 cooperate to suppress undesired background light. In an embodiment, the background light suppression may be accomplished in the manner described in co-owned U.S. Pat. No. 8,582,087, the contents of which is incorporated herein by reference. In an embodiment, the spatial filter 1009 contains centrally located pinhole formed in a disk-shaped mask as described in the above reference '087 patent. Since the background light that goes through the lens 1008 is not collimated it is not concentrated on the pinhole but rather over an area of the mask. The arrangement of the pinhole and the mask thus substantially blocks the undesired background light from striking the optical sensor 1010.

In an embodiment, the output of fiber optical cable 1045 emits the reference light beam towards a diffuser. The diffuser diffuses the incoming light and has been found, in combination with the imaging lens, to reduce speckle on the optical sensor effective area. It should be appreciated that since the reference light beam is on an angle relative to the surface of diffuser (and the optical axis of feedback light beam), the diffuser and lens redirect the reference light beam to allow the reference light beam to strike the optical sensor effective area. Thus, the reference light beam and feedback light beam both strike the same effective area of the detector. This provides advantages in reducing or eliminating signal errors that occurred in prior art systems that utilized separate and discrete optical sensors for the reference and feedback light beams. The system 1000 uses time-of-flight principles to determine the distance to the object 22 based on the time difference between the reference light beam pulse and the feedback light beam pulse striking the optical sensor.

It should be appreciated that in an embodiment, the reference light beam pulse may be eliminated, allowing the beam splitter 1040, the lens 1043, the attenuator 1044, and the fiber optic cable 1045 to be removed from the system 1000.

Figure 11:
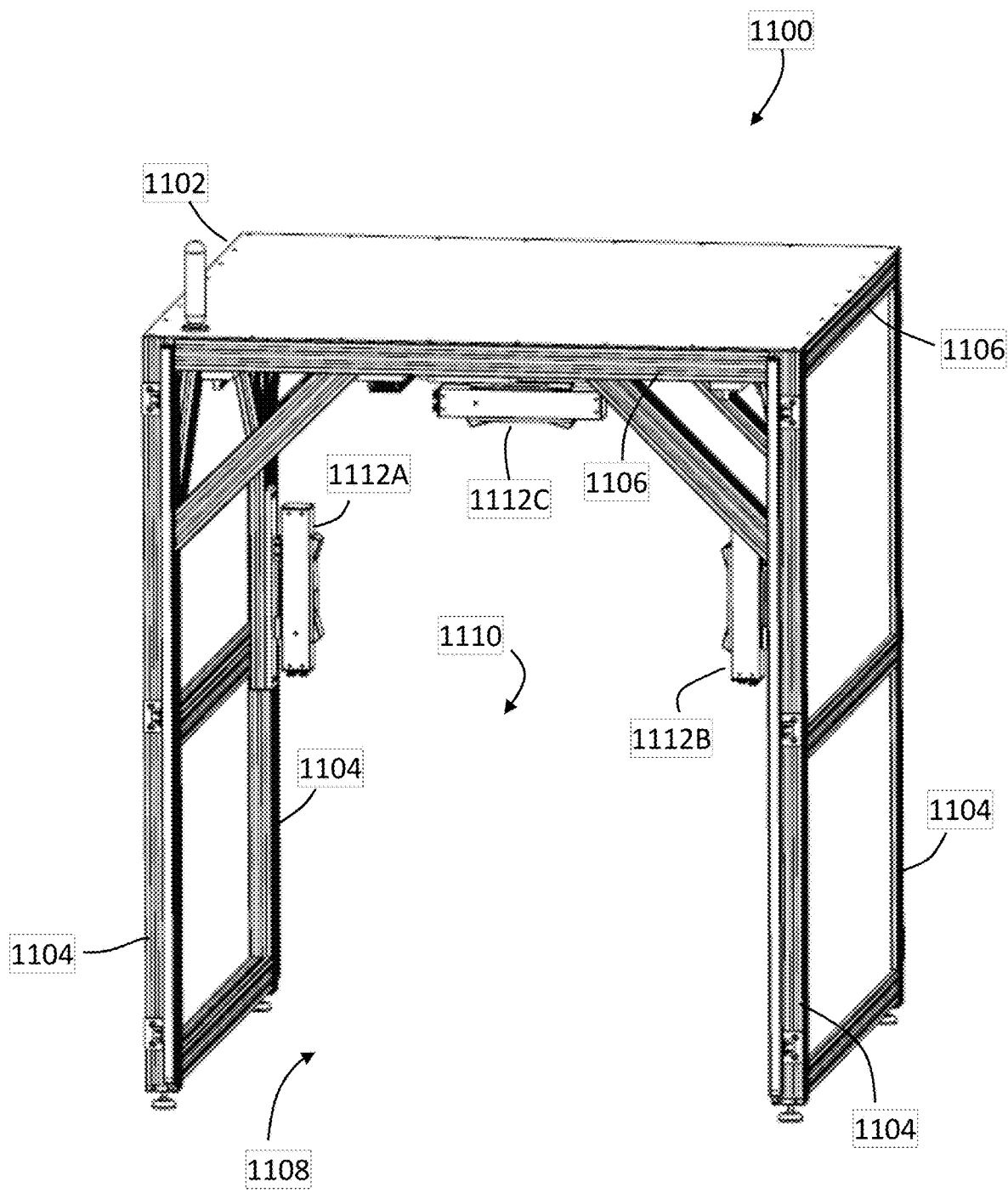
FIG. 11 is a perspective view of an inspection cell in accordance with another embodiment.
Figure 12:
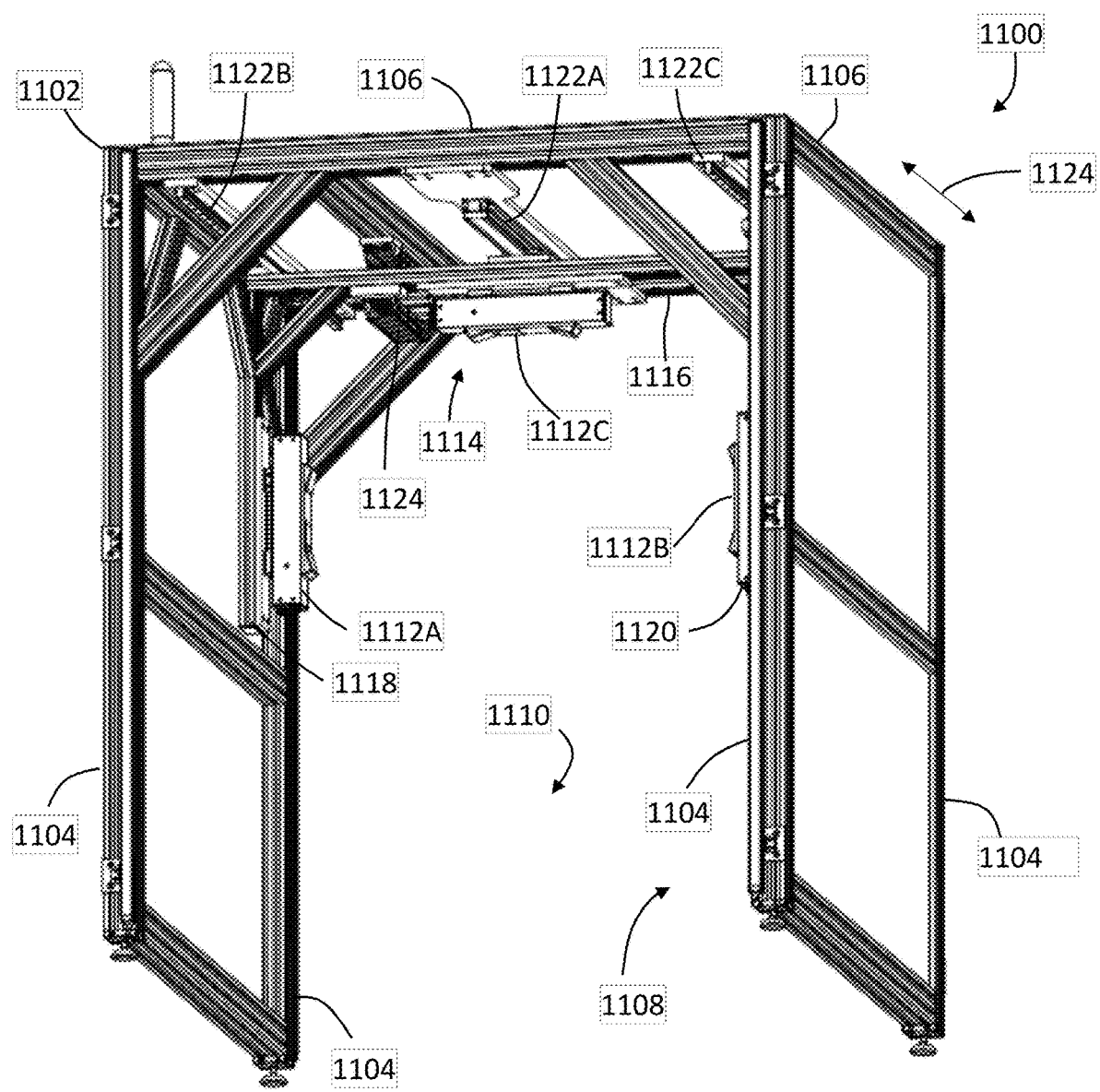
FIG. 12 is a reverse perspective view of the inspection cell of FIG. 11
Figure 13:
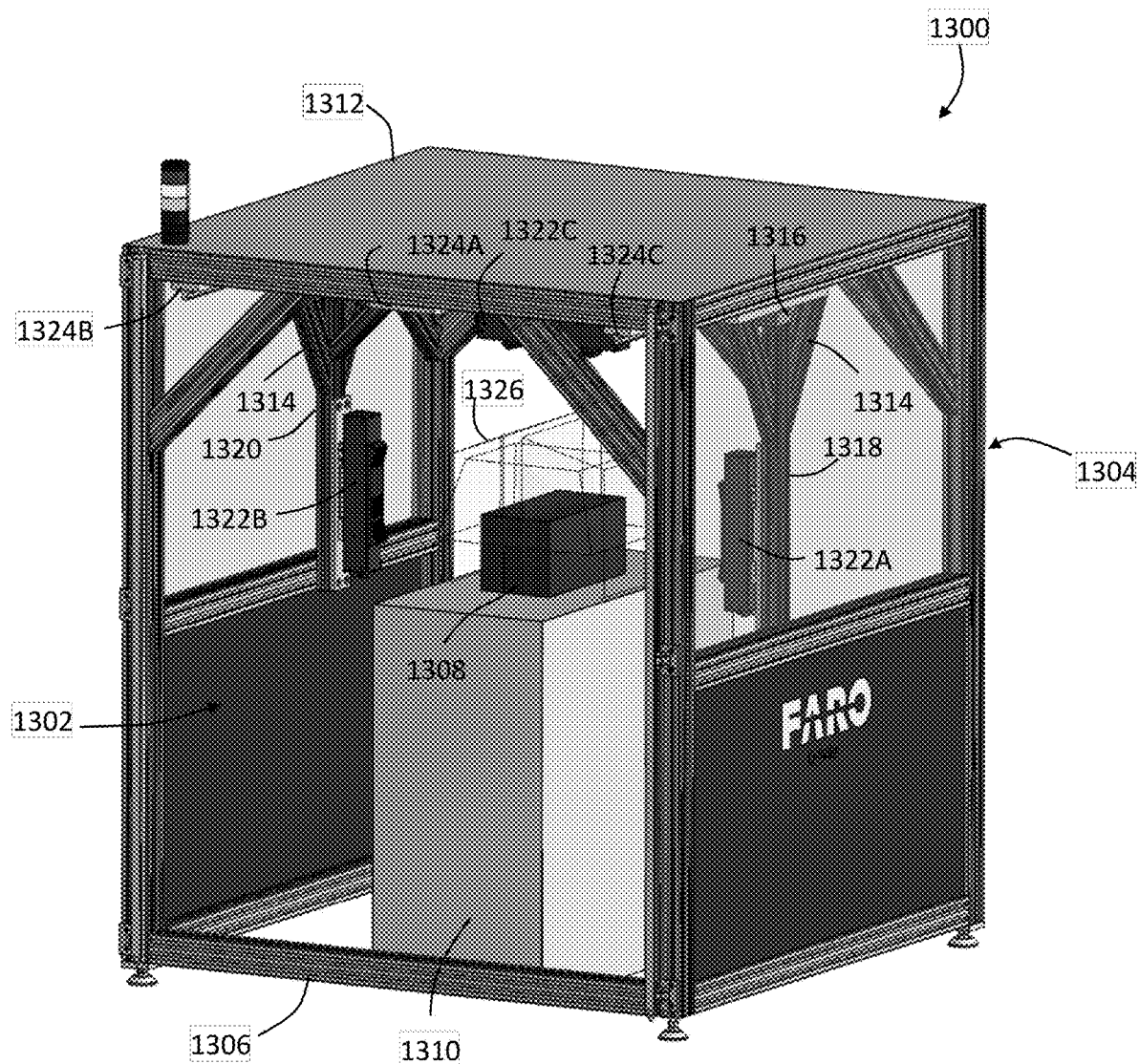
FIG. 13 is a perspective view of another inspection cell in accordance with an embodiment.

It should be appreciated that the inspection system 20 illustrated in FIG. 1 may also be applied to smaller objects. Referring now to FIG. 11 and FIG. 12, an inspection system 1100 is shown that combines together scan data from multiple measurements devices acquired on a moving target. The system 1100 includes a frame 1102 comprised of a plurality of upright posts 1104 and cross members 1106 that define an open area 1108 having an entryway 1110.

The system 1100 further includes a plurality of measurement devices 1112A, 1112B, 1112C. In the illustrated embodiment, the measurement devices 1112A, 1112B, 1112C are triangulation or area scanners, such as that described in commonly owned United States Patent Application 2017/0054965 or U.S. patent application Ser. No. 15/784,437, the contents of both of which are incorporated herein by reference. In an embodiment, the area scanners 1112A, 1112B, 1112C are the scanner shown and described with respect to FIGS. 14A-14D. As described in more detail below, in an embodiment, an area scanner emits a pattern of light from a projector onto a surface of an object and acquires a pair of images of the pattern on the surface. In at least some instances, the 3D coordinates of the elements of the pattern are able to be determined. In other embodiments, the area scanner may include two projectors and one camera.

The area scanners 1112A, 1112B, 1112C are mounted to a frame 1114 having a transverse member 1116, a first post member 1118 and a second post member 1120. The transverse member 1116 is generally parallel with the entryway 1110. The frame 1114 is mounted to the frame 1102 by rails 1122A, 1122B, 1122C. In an embodiment, the frame 1114 is slidable in operation along the rails 1122A, 1122B, 1122C in a direction indicated by the arrow 1124. The movement of the frame 1114 may be driven by one or more actuators, such as motors 1124 for example.

In operation, the area scanners 1122A, 1122B, 1122C are positioned adjacent the entryway 1110. As the object to be inspected is moved through the entryway 1110 the presence of the object will be detected by the area scanners 1122A, 1122B, 1122C. In an embodiment, the object may be on a movable platform, such as a cart for example. Upon detection of the object, the three dimensional coordinates of the object are acquired. In an embodiment, the object is moved into the open area 1108 and the scanning of the object is performed by moving the frame 1114 and area scanners 1122A, 1122B, 1122C along the rails 1122A, 1122B, 1122C. In still another embodiment, each of the area scanners 1122A, 1122B, 1122C are independently movable along the length of the respective member 1116, 1118, 1120 to which it is attached. It should be appreciated that the movement of the area scanners 1122A, 1122B, 1122C along the members 1116, 1118, 1120 allows the field of view of the area scanner to be changed. This could provide advantages in obtaining 3D coordinates of surfaces on the object that may otherwise be hidden or in a shadow of the initial position of the area scanner.

Once the scans are completed, the scan data, including the acquired 3D coordinates and the speed in which the object is moving are transferred to a computing device and the scans are registered as described herein. In an embodiment, the at least one of the area scanners 1122A, 1122B, 1122C includes a camera, such as a color camera for example, that acquires images of the object as the scanning is performed. As described herein, by tracking features of the object, between successive frames, the speed that the object is moving can be determined. Once the scan data is registered, a comparison of the object to specifications (e.g. a CAD model) may be performed to identify surfaces or features that are out of specification.

It should be appreciated that the inspection system 1100 is arranged to have the object pass through the frame 1104. In another embodiment, an inspection system 1300 is provided wherein a side 1302 opposite the entryway 1304 is not open, but rather includes one or more cross members 1306. The cross member 1306 prevents the object 1308 and the movable platform 1310 from passing through the frame 1312. Similar to the inspection system 1100, the inspection system 1300 has a frame 1314 having a transverse member 1316 and a pair of vertical posts 1318, 1320. Mounted to the transverse member 1316 and posts 1318, 1320 are area scanners 1322A, 1322B, 1322C. The frame 1314 is movably mounted on rails 1324A, 1324B, 1324C. In operation, the object 1308 is moved into the open space within the frame 1312. As the object 1308 moves towards the entryway 1304, the presence of the object 1308 is detected by the scanners 1322A, 1322B, 1322C and 3D coordinates of the object 1308 are acquires as the object is moved through the entryway 1304. The speed of the object 1308 may be determined by one or more cameras on the scanners 1322A, 1322B, 1322C. The object 1308 is then brought to a stop within the frame 1312 and the frame 1314 is optionally moved to acquire additional 3D coordinates. In an embodiment, the scanners 1322A, 1322B, 1322C are movable along the transverse member 1316 and the posts 1318, 1320 to allow the field of view 1326 of the scanners 1322A, 1322B, 1322C to be changed. Once the desired 3D coordinates have been acquired, the object 1308 is moved back through the entryway 1304 to exit the inspection system 1300.

In an embodiment, the area scanners 1122A, 1122B, 1122C and the area scanners 1322A, 1322B, 1322C are the scanner 1400 shown in FIGS. 14A-14D. In this embodiment, the area scanner 1400 is a triangulation scanner that includes a body 1405, a projector 1420, a first camera 1430, and a second camera 1440. In an embodiment, the projector optical axis 1422 of the projector 1420, the first-camera optical axis 1432 of the first camera 1430, and the second-camera optical axis 1442 of the second camera 1440 all lie on a common plane 1450, as shown in FIGS. 14C, 14D. In some embodiments, an optical axis passes through a center of symmetry of an optical system, which might be a projector or a camera, for example. For example, an optical axis may pass through a center of curvature of lens surfaces or mirror surfaces in an optical system. The common plane 1450, also referred to as a first plane 1450, extends perpendicular into and out of the paper in FIG. 14D.

In an embodiment, the body 1405 includes a bottom support structure 1406, a top support structure 1407, spacers 1408, camera mounting plates 1409, bottom mounts 1410, dress cover 1411, windows 1412 for the projector and cameras, Ethernet connectors 1413, and GPIO connector 1414. In addition, the body includes a front side 1415 and a back side 1416. In an embodiment, the bottom support structure and the top support structure are flat plates made of carbon-fiber composite material. In an embodiment, the carbon-fiber composite material has a low coefficient of thermal expansion (CTE). In an embodiment, the spacers 1408 are made of aluminum and are sized to provide a common separation between the bottom support structure and the top support structure.

In an embodiment, the projector 1420 includes a projector body 1424 and a projector front surface 1426. In an embodiment, the projector 1420 includes a light source 1425 that attaches to the projector body 1424 that includes a turning mirror and a diffractive optical element (DOE). The light source 1425 may be a laser, a superluminescent diode, or a partially coherent LED, for example. In an embodiment, the DOE produces an array of spots arranged in a regular pattern. In an embodiment, the projector 1420 emits light at a near infrared wavelength.

In an embodiment, the first camera 1430 includes a first-camera body 1434 and a first-camera front surface 1436. In an embodiment, the first camera includes a lens, a photosensitive array, and camera electronics. The first camera 1430 forms on the photosensitive array a first image of the uncoded spots projected onto an object by the projector 1420. In an embodiment, the first camera responds to near infrared light.

In an embodiment, the second camera 1440 includes a second-camera body 1444 and a second-camera front surface 1446. In an embodiment, the second camera includes a lens, a photosensitive array, and camera electronics. The second camera 1440 forms a second image of the uncoded spots projected onto an object by the projector 1420. In an embodiment, the second camera responds to light in the near infrared spectrum. In an embodiment, a processor 1402 is used to determine 3D coordinates of points on an object according to methods described herein below. The processor 1402 may be included inside the body 1405 or may be external to the body. In further embodiments, more than one processor is used. In still further embodiments, the processor 1402 may be remotely located from the triangulation scanner.

In an embodiment, images from at least one of the cameras 1430, 1440 are used to determine the speed that the object is moving. In an embodiment, the change in position of features on the object are determined between frames to determine the speed of the object. In another embodiment, LED lights on the mobile platform 1310 are tracked from frame to frame to determine the speed of the object.

It should be appreciated that while embodiments herein describe the object as moving through, or at least relative to, the entryway, this is for example purposes and the claims should not be so limited. In other embodiments, the object remains stationary and the entryway moves relative to the object from a first position to a final position. In an embodiment, the movement of the entryway may be determined using a position encoder in the linear axis.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of inspecting an object, the method comprising:
   detecting the object entering an entryway;

initiating operation of at least two non-contact coordinate measurement devices, the at least two non-contact coordinate measurement devices being positioned with a field of view at least partially within or adjacent the entryway;

acquiring 3D coordinates of the object with each of the at least two non-contact coordinate measurement devices;

measuring a six-degree of freedom (6DOF) pose of the object with a pose measurement device; and registering the 3D coordinates acquired by each of the at least two non-contact coordinate measurement devices based at least in part on the measured 6DOF pose.

2. The method of claim 1, further comprising measuring the speed of the object when the measuring the 6DOF pose.

3. The method of claim 2, further comprising determining the 6DOF pose based on the measured speed and a time measurement.

4. The method of claim 1, further comprising moving the object from a first position to a second position while acquiring the 3D coordinates.

5. The method of claim 1, further comprising moving the entryway from a first position to a second position while acquiring the 3D coordinates.

6. The method of claim 4, further comprising determining the position and orientation of the object in the second position with the pose measurement device.

7. The method of claim 1, further comprising determining the location of an anomaly on the surface of the object based at least in part on the 3D coordinates of a plurality of points on the surface of the object.

8. The method of claim 7, further comprising emitting visible light with at least one projector onto the object based on the location of the anomaly.

9. The method of claim 1, further comprising moving the pose measurement device from an initial position and follow a path when the object is in a second position.

10. The method of claim 9, further comprising measuring 3D coordinates for a second plurality of points with the pose measurement device while the pose measurement device moves along the path.

11. The method of claim 6, wherein the determination of the position and orientation of the object includes comparing the 3D coordinates of the second plurality of points with an electronic model of the environment in which the object is located.

12. The method of claim 2, wherein the measurement of the speed of the object includes acquiring a plurality of images of the object as the object moves.

13. The method of claim 12, wherein at least one of the at least two non-contact coordinate measurement devices is located beneath a surface upon which the object is moved.

14. The method of claim 13, further comprising measuring 3D coordinates with the at least one of the at least two non-contact coordinate measurement devices by projecting light through a gap in the surface.

15. The method of claim 1, wherein the object is an aircraft.

16. The method of claim 1, wherein the entryway is defined by a first frame and a second frame, the second frame being movably coupled to the first frame, each of the at least two non-contact coordinate measurement devices being coupled to a different portion of the second frame.

17. The method of claim 16, wherein the acquiring of the 3D coordinates is performed when the second frame is moved.

18. The method of claim 17, wherein the pose measurement device includes a camera operably coupled to at least one of the at least two non-contact coordinate measurement devices.

19. The method of claim 18, wherein the at least two non-contact coordinate measurement devices are area scanners.

* * * * *